Nov. 3, 1959  L. PERAS  2,911,230
RECIPROCAL SUSPENSION SYSTEM WITH HYDRAULIC TRANSMISSION
Filed May 28, 1957  2 Sheets-Sheet 1

INVENTOR.
LUCIEN PERAS
BY Robert C. Burns
ATTORNEY

Nov. 3, 1959 L. PERAS 2,911,230
RECIPROCAL SUSPENSION SYSTEM WITH HYDRAULIC TRANSMISSION
Filed May 28, 1957 2 Sheets-Sheet 2

INVENTOR.
LUCIEN PERAS
BY Robert E. Burns
ATTORNEY

United States Patent Office 2,911,230
Patented Nov. 3, 1959

2,911,230

RECIPROCAL SUSPENSION SYSTEM WITH HYDRAULIC TRANSMISSION

Lucien Peras, Billancourt, France, assignor to Regie Nationale des Usines Renault, Billancourt, France, a French works under the control and authority of the French Government Application May 28, 1957, Serial No. 662,198

Claims priority, application France June 5, 1956

5 Claims. (Cl. 280—104)

This invention relates in general to the suspension systems of vehicles and more particularly to reciprocal suspension systems incorporating hydraulic transmission means.

According to the primary object of this invention, a suspension system is provided which is of the reciprocal type with hydraulic transmission means and interacting front and rear wheels, this arrangement is adapted to be combined with the action of one wheel on the other three, either one of these arrangements being adapted to act as a function of the conditions of operation of the vehicle.

According to the first arrangement broadly set forth hereinabove, the action exerted by each of these wheels on the ground on a same side is transmitted through hydraulic means from separate wheel cylinders solid with the vehicle body and provided with a piston having its rod pivotally attached to an intermediate point of the relevant wheel swinging arm, at either end of a suspension spring disposed between two pistons and adapted to move in a central cylinder between a pair of return or rebound-checking springs. Thus, two identical and symmetrical devices are provided, one on each side. The elastic deformations of the suspension spring are damped out by causing a hydraulic fluid to flow through gaged orifices to a reservoir at atmospheric pressure, so that no direct damping action is provided between the wheels and the vehicle body.

The alternate arrangement consists essentially in connecting transversely, and in a controlled manner, the two assemblies defined hereinabove which may be rendered either independent of each other, notably according to the transverse inclination of the vehicle body, or subjected to the action of a hydraulic agent under pressure for the purpose of correcting the rolling as well as limiting the longitudinal inclination of the body during application of the brakes, or adjusting the height of the body as a function of the load distribution.

This general organization of the suspension system leads to different arrangements, the simplest ones being particularly suitable for low-priced cars which are not provided with any special auxiliary source of energy, whereas more elaborate installations may be associated with higher-cost vehicles normally equipped with servo-control means.

In order to afford a clearer understanding of the invention, several forms of embodiment of the suspension systems of this invention will now be described by way of example with reference to the attached diagrammatic drawings forming part of this specification and wherein.

Figure 3:
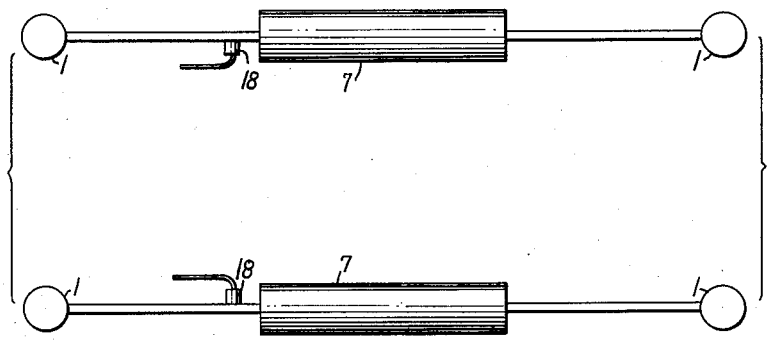
Figure 4:
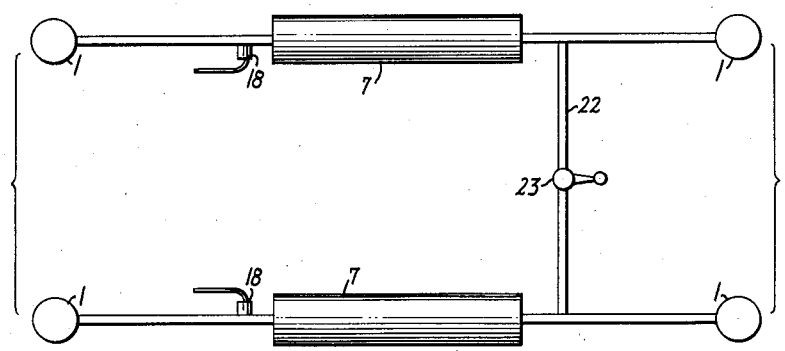
Figure 5:
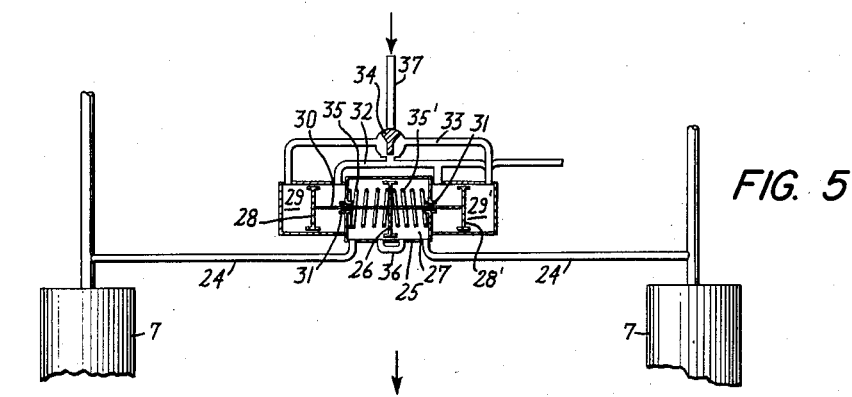
Figure 6:
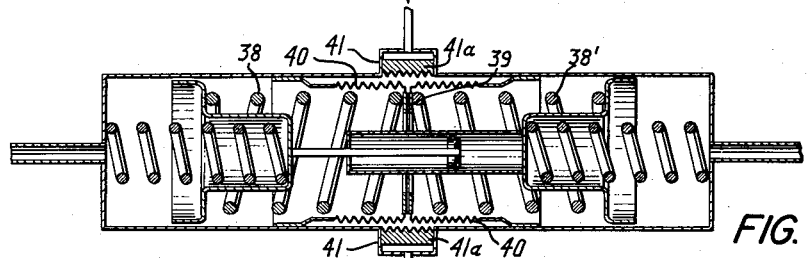
Figure 7:
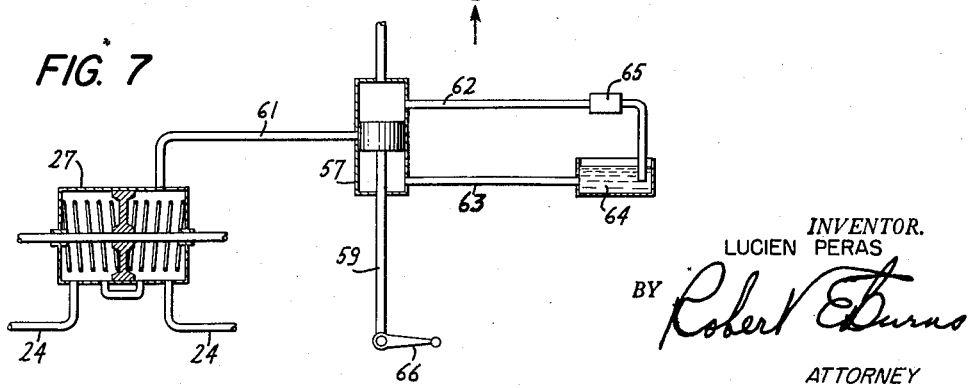

Figs. 3 and 4 are diagrammatic views showing respectively on the one hand a suspension system wherein an interaction is provided between the wheels on a same side of the vehicle, and on the other hand a suspension system of same design but comprising in addition means whereby each wheel may act on the other three, both systems being mounted on vehicles which are not provided with any special source of energy;

Fig. 5 is a diagrammatic view showing a rolling corrector for a vehicle equipped with servo-control means;

Fig. 6 is a modified embodiment of the device provided in the central cylinder of each assembly for limiting the longitudinal inclination of the vehicle body during an application of the brakes;

Fig. 7 is a diagrammatic view of a leveling arrangement usable with the rolling corrector shown in Fig. 5 according to the invention.

Figure 1:
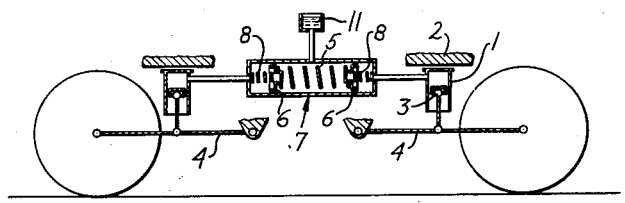
Fig. 1 is a diagram showing the hydraulic connection between the wheels located on the same side of a vehicle.

Referring to Fig. 1 it will be seen that the front and rear wheels located on the same side of a vehicle are interconnected through hydraulic damping means comprising the following component elements: for each wheel, a cylinder 1 fixed to the vehicle body 2 and having reciprocably mounted therein a piston 3 the rod of which has its outer end pivotally attached to an intermediate point of the relevant wheel suspension arm 4. Road shocks or bumps on the wheels are transmitted hydraulically from the upper chamber of the cylinders 1 to the two ends of a suspension spring proper 5 located between two pistons 6 and slidably mounted in a central cylinder 7 between a pair of return springs 8.

The central cylinder 7 (Fig. 2) is divided into three compartments of variable capacity; the extreme compartments 9, 9¹ are under pressure due to the action exerted by the weight of the vehicle, and the central compartment 10 formed between the pistons 6 compressing the suspension spring 5 is connected to a reservoir 11 filled with liquid at the ambient or atmospheric pressure. The return springs 8 are positioned in adequate recesses 12 formed in the pistons 6 and assist in maintaining the suspension system in a balanced condition as consistent with the distribution of the front and rear loads. This condition is the equality on either side of the suspension spring 5 of the pressure exerted on each piston 6 plus the resilient force of the spring 8 associated with this piston.

On the other hand, in a reciprocal suspension system it is advantageous not to introduce a direct damping action between a wheel and the sprung part of the vehicle as this would be like transmitting to the body a more considerable fraction of the kinetic energy of the unsprung part and would initiate a pitching movement.

Besides, it is advisable to prevent the rebound oscillation parallel to the ground from being sustained by subjecting the resilient member to a damping action.

Thus, the reactions of the suspension spring 5 are damped out by rigidly associating with the pistons 6 on the one hand a cylinder 16 and on the other hand a piston 15 slidably fitted in this cylinder 16 and provided with a valve 15¹. The spring expansion is retarded by the passage of hydraulic fluid through the calibrated orifice 17.

The spring 5 may be compressed relatively freely due to the provision of the valve 15¹ and of the large-sectioned orifice 17¹, but this spring compression may be retarded if need be by a non-return valve 13 formed with a small orifice 14 and located in a duct leading to the reservoir 11 containing hydraulic fluid at atmospheric pressure. Of course, any other damping system adapted directly to control the compression and expansion of the spring 5 may be utilized as well.

Now all the different suspension system arrangements described hereafter in connection with the attached drawings are based on the use, on either side of the vehicle, of an assembly of the type described hereinabove and illustrated in Figs. 1 and 2.

Figures 3 and 4 illustrate diagrammatically two simple arrangements particularly suitable for low-priced vehicles not equipped with any special or auxiliary source of energy or servo-power.

In the first embodiment (Fig. 3) the suspension system comprises only the mounting of the two assemblies independent of each other. In this case there is an interaction between the front wheel and the rear wheel on the same side, the anti-roll torque being the same as on a vehicle of conventional design. To restrict the pitching movement normally damped by the action of the return springs 8 but likely to assume a substantial amplitude during a brake application due to the inertia of the vehicle, means for partially obturating or choking the pipe lines between the wheel cylinders and the central cylinder are provided.

Figure 2:
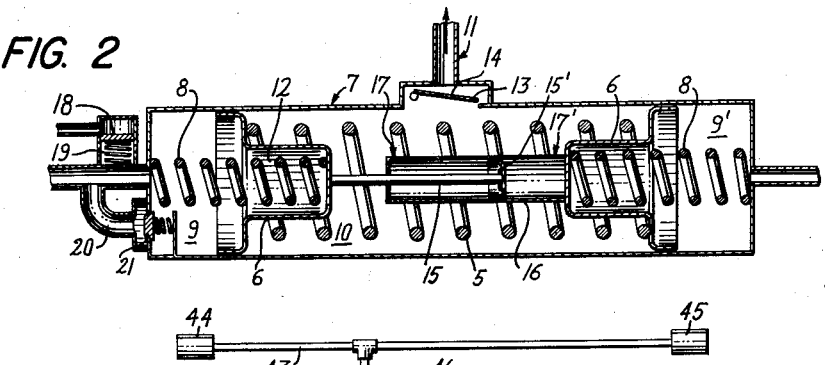
Fig. 2 is a longitudinal section showing the central cylinder of each assembly.
Figure 2A:
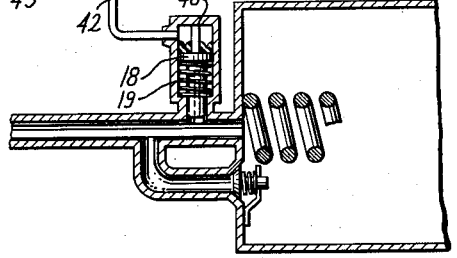
Fig. 2A is a fragmentary view on an enlarged scale of one end of the cylinder of Fig. 2.

This partial choking action is applied, of course, to the pipe lines of the front axle and may be obtained, for example, through the displacement of a valve member or piston 18 actuated by the hydraulic brake installation against the resistance of a return spring 19 (Figs. 2 and 2A). The purpose of this choking action is to stiffen the front suspension during the brake application. But to avoid the inconvenience resulting from a brake application on an uneven ground the arrangement may comprise in addition a branch pipe 20 provided with a gaged valve 21 in order to limit to a predetermined value the pressure increase in the front circuit during the occurrence of road shocks. Thus a cylinder 46 in which a valve member formed as a piston 18 is housed, is connected to the vehicle brake system by means of a conduit 42 connected to brake system lines such as 43 with a master cylinder 44 in communication with an individual brake cylinder 45. When the brakes are applied the fluid pressure developed by the master cylinder moves the valve member 18 against the upward pressure exerted by spring 19 so that a downwardly extending portion of the valve member disposed axially of spring 19, as shown, isolates the central cylinder 7 of the corresponding assembly from the forward part of the hydraulic circuit of the suspension system thereby stiffening the front suspension of the vehicle in order to compensate for the forward shift in load that takes place when the brakes are applied.

In the alternate embodiment illustrated diagrammatically in Fig. 4 the two longitudinal or lateral assemblies are interconnected through a transverse connection consisting of a pipe line 22 whereby the reaction of one wheel may be transmitted to the other three. In this mounting anti-roll control means of moderate stiffness such as a torsion bar, not shown, mounted between the right-hand and the left-hand wheels, may advantageously be provided. Moreover, the transverse connection is closed off, when the vehicle body is inclined beyond a predetermined limit value in the transverse direction, by a valve 23 actuated either by mechanical control means, not shown, which is responsive to the inclination of a plane connecting the centers of the off- and near-side wheels, or by an inertia weight, not shown, responsive for instance to centrifugal force and connected to valve 23 or by the movements of the steering linkage, or by a combination of these various control means.

In these two arrangements (Figs. 3 and 4) the stiffness of the pitch control springs 8 is so calculated that the longitudinal inclination of the vehicle body which corresponds to the extreme conditions of load distribution on the front and rear wheels is kept within reasonable limits.

In the case of a larger or more elaborate vehicle comprising a central source of servo or auxiliary power the suspension system according to this invention may be constructed differently and the external source of energy utilized for correcting the rolling movements, the lever or ground clearance of the vehicle body, and also for improving the conditions in which the longitudinal inclination of this body is limited during a brake application.

In the embodiment shown diagrammatically in Fig. 5 the two longitudinal or lateral assemblies are interconnected in the transverse direction at the front as well as at the rear through pipe lines 24 each provided with a rolling movement corrector.

Each rolling movement corrector (see Fig. 5) comprises a cylinder 25 divided into three fluid-tight compartments. A three-piston assembly is slidably mounted in this apparatus; this assembly comprises a piston 26 in the central compartment 27, and pistons 28, $28^1$ in the extreme compartments 29, $29^1$. These three pistons are interconnected by a rod 30 extending through rod or plunger packings 31 across the walls separating the compartments from one another.

The central compartment 27 communicates through the pipe lines 24 with the suspension cylinders 7. The end compartments 29, $29^1$ are normally connected to the reservoir of hydraulic fluid at the ambient pressure (not shown) through pipe lines 32, 33 and a valve 34.

The piston assembly is held in a central or neutral position by a pair of opposed springs 35, $35^1$.

In this position a passage 36 permits free communication between the two suspension cylinders 7 and as a result each wheel is adapted to react on the other three.

When the valve 34 is actuated as already explained in connection with the actuation of valve 23 it supplies fluid under pressure through the pipe line 37 to either of the outer chambers of the end compartments 29, $29^1$, the remaining two chambers of the cylinder compartments remain connected to the reservoir at the ambient pressure. At this time the piston 26 is moved and closes the passage 36 between the suspension cylinders 7.

Moreover, during this movement the piston 26 takes a certain quantity of hydraulic fluid from one of the suspension cylinders 7 and forces the same quantity of fluid into the other cylinder. The pressure distribution effected by the valve 34 is such that the transfer of hydraulic fluid accomplished by the piston 26 causes fluid under pressure to be delivered to that cylinder in which the suspension spring is compressed and therefore a pressure reduction through the increase in the volume available for the fluid in the cylinder where the suspension spring is allowed to expand, so that the vehicle body is efficiently prevented from inclining beyond a predetermined amplitude.

When the cause of this transverse inclination has disappeared the valve 34 restores the communication between the reservoir containing the fluid at the ambient pressure and the four chambers of compartments 29 and $29^1$.

The springs 35 and $35^1$ restore the piston 26 to its intermediate position and communication is restored between the suspension cylinders.

It will be noted that the quantity of fluid which determines the height of the vehicle body both at the front and at the rear remains unaltered since the servo action is exerted from the outside.

A simple means of limiting the longitudinal inclination of the vehicle body during application of the brakes has been described hereabove, the only drawback of this arrangement is the fact that it causes a momentary hardening of the suspension. If fluid under pressure is available, it is still possible to avoid the interaction of the front axle on the rear axle during braking of the vehicle by modifying the suspension cylinder as illustrated in Fig. 6.

In this case the suspension spring is divided into two elements or halves 38 and $38^1$ bearing against an intermediate inner shoulder or annular flange 39 carried by a bellows or like member 40. Thus, as the brakes are applied the bellows 40 will be locked by a servo action set up by the actuation of the brake pedal.

The locking member proper may be constructed in the form of a pair of shoes 41a formed with internal corrugations corresponding to the circular corrugations of the outer surface of the bellows; these shoes 41a are adapted to be pressed against the bellows by moving within hydraulic cylinders 41.

Thus, during application of the brakes the interaction between the front and rear axles is suppressed, each front and rear suspension remaining flexible but to a lower degree. If desired, the arrangement most consistent with a proper wheel adherence may be obtained by providing a different number of spring coils on either side of the shoulder or flange 39.

Finally, if an auxiliary power plant is available on board the vehicle it is possible to adjust the height of the car body at will. This adjustment may simply consist in correcting the height of the most variable portion according to the load distribution of the vehicle, for example the rear portion in the case of a vehicle having a front engine and vice versa.

It consists simply (Fig. 7) in providing a pipe line 61 leading for example into the central compartment 27 of the rolling movement correcting apparatus associated with the front or rear axle, according to cases, this pipe line 61 being connected to a valve 57. A line 62 connected with a central source of fluid under pressure from a pump 65 or a line 63 connected to a reservoir 64, containing the fluid at the ambient pressure may be connected to line 61 through valve 57.

This adjustment may be effected automatically, by means not shown, or by the driver when starting the vehicle by use of a lever 66 connected to the valve 57 by a rod 59. The desired adjustment is maintained during the operation of the vehicle, this is done by locking the lever in position or also by automatically holding valve 57 in a set position if desired.

In fact, it is preferable to neutralize the vehicle levelling or height-adjusting action during the normal operation of the vehicle in order to avoid possible subsequent misadjustments or distrubances due to successive variations in the height between the sprung and the unsprung portions of the vehicle.

Therefore, the vehicle body may be set in the proper horizontal position either manually by actuating for example a valve, or automatically by causing this valve to be operated electrically or electro-magnetically.

Of course, the various embodiments contemplated herein and described with reference to the attached drawings should not be construed as limiting the purpose of this invention as many modifications and alterations may be brought thereto without departing from the basic principles of the invention as set forth in the appended claims.

I claim:

1. A reciprocal hydraulic suspension system for a vehicle having front and rear wheels comprising, an off-side suspension assembly and a near-side suspension assembly, each assembly comprising, for each wheel a cylinder operatively associated with at least each wheel of the side concerned, each cylinder being mounted in a fixed position on the vehicle fame, a piston in each cylinder and reciprocable therein, for each wheel a suspension arm pivotally mounted on said frame, for each piston a piston rod pivotally attached to an intermediate point of a respective wheel suspension arm, a central cylinder fixed to the vehicle frame, a pipe line connecting each wheel cylinder to a respective end compartment of said central cylinder, a pair of opposed pistons reciprocable in said central cylinder disposed dividing it into central compartments and two end compartments, a suspension spring of the compression type disposed between the two opposed pistons, a return spring in each of said compartments each urging a respective opposed piston against said suspension spring, a fluid-containing reservoir for containing hydraulic fluid therein at atmospheric pressure, another pipe line providing communication between the reservoir and said central compartment, damping means for limiting the rebound of said suspension spring, said damping means comprising an auxiliary cylinder in said central compartment and fixed to one of said opposed pistons, an auxiliary piston reciprocable in said auxiliary cylinder and fixed to the other of said opposed pistons, said auxiliary cylinder having a first and second orifice on opposite sides of said auxiliary piston and providing communication between the interior of the central compartment and the interior of said auxiliary cylinder, one of said orifices having a smaller cross-section than the other, valve means disposed in the pipe line providing communication between the reservoir and said central compartment, said valve means having a gaged orifice to restrict the flow of hydraulic fluid in a given direction of flow corresponding to the direction of flow from the central compartment to the reservoir.

2. A reciprocal hydraulic suspension system for a vehicle having front and rear wheels comprising, an off-side suspension assembly and a near-side suspension assembly, each assembly comprising, for each wheel a cylinder operatively associated with at least each wheel of the side concerned, each cylinder being mounted in a fixed position on the vehicle frame, a piston in each cylinder and reciprocable therein, for each wheel a suspension arm pivotally mounted on said frame, for each piston a piston rod pivotally attached to an intermediate point of a respective wheel suspension arm, a central cylinder fixed to the vehicle frame, a pipe line connecting each wheel cylinder to a respective end compartment of said central cylinder, a pair of opposed pistons reciprocable in said central cylinder disposed dividing it into a central compartment and two end compartments, a suspension spring of the compression type disposed between the crowns of said two opposed pistons, a return spring in each of said compartments each urging a respective opposed piston against said suspension spring, a fluid-containing reservoir for containing hydraulic fluid therein at atmospheric pressure, another pipe line providing communication between the reservoir and said central compartment, damping means for limiting the rebound of said suspension spring, said damping means comprising an auxiliary cylinder in said central compartment and fixed to one of said opposed pistons, an auxiliary piston reciprocable in said auxiliary cylinder and fixed to the other of said opposed pistons, said auxiliary cylinder having a first and second orifice on opposite sides of said auxiliary piston and providing communication between the interior of the central compartment and the interior of said auxiliary cylinder, one of said orifices having a smaller cross-section than the other.

3. A reciprocal hydraulic suspension system for a vehicle having front wheels and rear wheels and a hydraulic brake system, which comprises an off-side suspension assembly and a near-side suspension assembly, each of said assemblies comprising for each wheel a cylinder fixed to the vehicle frame and each operatively associated with each wheel of the side concerned, in each cylinder a piston slidably mounted therein, for each wheel a pivoted suspension arm, a rod for each piston each being pivotally attached to an intermediate point of a respective wheel suspension arm pivotally connecting the relevant wheel to the vehicle frame, a central cylinder fixed to the vehicle frame, a pipe line connecting each wheel cylinder to a relevant end compartment of said central cylinder, a pair of opposed pistons in said central cylinder disposed dividing it into a central compartment and two end compartments separated from said central compartment, a suspension spring of the compression type interposed between said central cylinder opposed pistons and two return springs in each of said end compartments urging the two pistons toward a rest position, a hydraulic fluid reservoir for containing fluid therein at atmospheric pressure, another pipe line connecting said central compartment to said reservoir containing the hydraulic fluid at atmospheric pressure, damping means in said central cylinder for limiting the rebound of said suspension spring, said damping means consisting of an auxiliary piston fixed to one of the opposed pistons movable in said central cylinder and an auxiliary cylinder slidably engaged by said auxiliary piston and fixed to the other piston of said central cylinder, said auxiliary cylinder having a first gaged orifice and a second gaged orifice of smaller section formed in its wall to constitute a fluid connection between chambers defined in said auxiliary cylinder on either side of said auxiliary piston and the central compartment of said central cylinder, valve means interposed in said pipe line connecting said central compartment to said reservoir containing a hydraulic fluid at atmospheric pressure, said valve means having a gaged orifice to restrict the flow of hydraulic fluid in the direction towards said reservoir, means for limiting to a predetermined maximum value the pitching of the vehicle during a brake application comprising a spring-loaded piston responsive to the hydraulic pressure generated in the hydraulic brake system, said spring-loaded piston being adapted during a brake application to reduce the volumetric capacity of, and therefore increase the hydraulic pressure in, the front portion of the hydraulic circuit of the suspension system so as to stiffen the front suspension, and other means in the form of a by-pass incorporating a spring-loaded valve positioned in said front portion for limiting to the proper value said reduction of the volumetric capacity of, and said increase in the hydraulic pressure in, said front portion of the suspension hydraulic circuit.

4. A reciprocal hydraulic suspension system for a vehicle having front wheels and rear wheels, which comprises an off-side suspension assembly and a near-side suspension assembly, each of said assemblies comprising, for each wheel a cylinder fixed to the vehicle frame and each operatively associated with each wheel of the side concerned, for each cylinder a piston slidably mounted therein, a pivoted suspension arm for each wheel, a rod for each piston each being pivotally attached to an intermediate point of a respective wheel suspension arm pivotally connecting the relevant wheel to the vehicle frame, a central cylinder fixed to the vehicle frame, a pipe line connecting each wheel cylinder to a respective end compartment of the central cylinder, a pair of opposed pistons in said central cylinder disposed dividing it into a central compartment and two end compartments separated from said central compartment, an annular bellows mounted in said central compartment and having a central annular flange portion extending radially inwardly in said central compartment, a suspension spring of the compression type which is divided into two halves located on either side of the internal annular flange projecting from the inner wall of the bellows mounted in the middle of said central compartment, a pair of return springs disposed one each in each of said end compartments, a reservoir for containing hydraulic fluid therein at atmospheric pressure, another pipe line connecting said central compartment to the reservoir, friction shoes disposed externally of said bellows, and servo means responsive to the actuation of the brake pedal of the vehicle for urging said friction shoes against said bellows and lock same in the position occupied thereby at the time of a brake application.

5. A reciprocal hydraulic suspension system as set forth in claim 4, wherein said servo means responsive to the actuation of the brake pedal consist of hydraulic cylinders operatively connected to said friction shoes.

References Cited in the file of this patent

UNITED STATES PATENTS 1,071,547    Bertschy _____ Aug. 26, 1913

FOREIGN PATENTS

B32,287    Germany _____ May 17, 1956